United States Patent
Suzuki et al.

(10) Patent No.: US 10,498,525 B2
(45) Date of Patent: Dec. 3, 2019

(54) EQUALIZER CIRCUIT, RECEPTION CIRCUIT, AND SEMICONDUCTOR INTEGRATED CIRCUIT

(71) Applicant: SOCIONEXT INC., Yokohama-shi, Kanagawa (JP)

(72) Inventors: Daisuke Suzuki, Yokohama (JP); Masahiro Kudo, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 16/230,717

(22) Filed: Dec. 21, 2018

(65) Prior Publication Data
US 2019/0149315 A1  May 16, 2019

Related U.S. Application Data

(63) Continuation of application No. PCT/JP2016/069441, filed on Jun. 30, 2016.

(51) Int. Cl.
*H04L 7/00* (2006.01)
*H04B 3/06* (2006.01)
(Continued)

(52) U.S. Cl.
CPC ............ *H04L 7/0058* (2013.01); *H04B 3/04* (2013.01); *H04B 3/06* (2013.01); *H04L 25/03* (2013.01);
(Continued)

(58) Field of Classification Search
CPC ............ H04L 7/0058; H04L 25/03057; H04L 2025/03484
See application file for complete search history.

(56) References Cited

U.S. PATENT DOCUMENTS

| 5,245,561 A | 9/1993 | Sugiyama |
| 7,397,848 B2 * | 7/2008 | Stojanovic ............ H04L 25/063 375/229 |

(Continued)

FOREIGN PATENT DOCUMENTS

| JP | H01-258511 A | 10/1989 |
| JP | H04-230112 A | 8/1992 |

(Continued)

OTHER PUBLICATIONS

English Translation of International Preliminary Report on Patentability Chapter I for International Application No. PCT/JP2016/069441, dated Jan. 1, 2019 (Year: 2019).*

(Continued)

*Primary Examiner* — Nader Bolourchi
(74) *Attorney, Agent, or Firm* — Arent Fox LLP

(57) ABSTRACT

An equalizer circuit includes: an addition circuit configured to add an input signal and a compensation signal; a comparison circuit configured to compare an output signal of the addition circuit; a plurality of first latch circuits configured to hold an output signal of the comparison circuit, the plurality of first latch circuits being connected in cascade; a selection circuit configured to select and output one of output signals of the comparison circuit and the plurality of first latch circuits; a second latch circuit configured to hold an output signal of the selection circuit; and a digital analog conversion circuit configured to generate the compensation signal, based on an output signal of the second latch circuit.

20 Claims, 6 Drawing Sheets

(51) Int. Cl.
　　　*H04L 25/03*　　　(2006.01)
　　　*H04B 3/04*　　　(2006.01)
(52) U.S. Cl.
　　　CPC .................. *H04L 25/03057* (2013.01); *H04L 2025/03484* (2013.01)

(56) References Cited

U.S. PATENT DOCUMENTS

| | | |
|---|---|---|
| 2004/0203559 A1 | 10/2004 | Stojanovic et al. |
| 2008/0187036 A1 | 8/2008 | Park et al. |
| 2015/0280948 A1 | 10/2015 | Nakao |

FOREIGN PATENT DOCUMENTS

| | | |
|---|---|---|
| JP | H09-326728 A | 12/1997 |
| JP | H11-261461 A | 9/1999 |
| JP | 2000-049664 A | 2/2000 |
| JP | 2007-525061 A | 8/2007 |
| JP | 2015-192200 A | 11/2015 |

OTHER PUBLICATIONS

English Translation of International Search Report for International Application No. PCT/JP2016/069441, dated Aug. 9, 2016 (Year: 2016).*

English Translation of the Written Opinion of the International Searching Authority for International Application No. PCT/JP2016/069441, dated Jun. 11, 2018 (Year: 2018).*

Extended European Search Report of related international Patent Application No. PCT/JP2016/069441 dated Feb. 26, 2019.

International Search Report of related International Patent Application No. PCT/JP2016/069441 dated Aug. 9, 2016.

* cited by examiner

F I G. 4
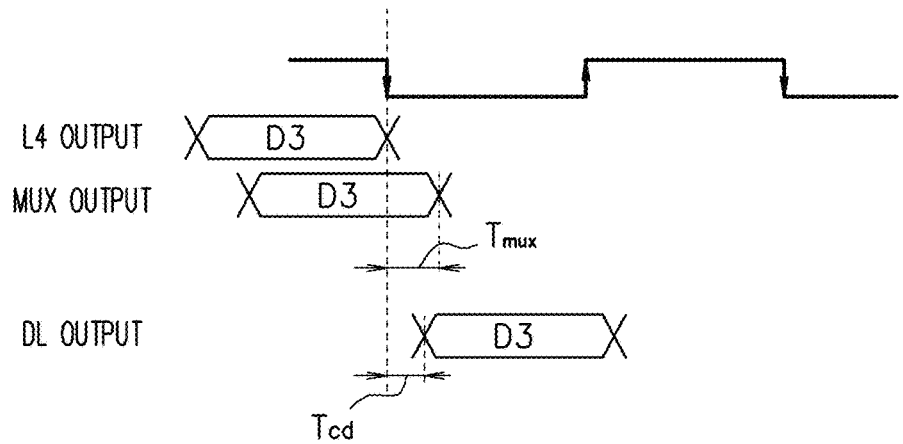
F I G. 5
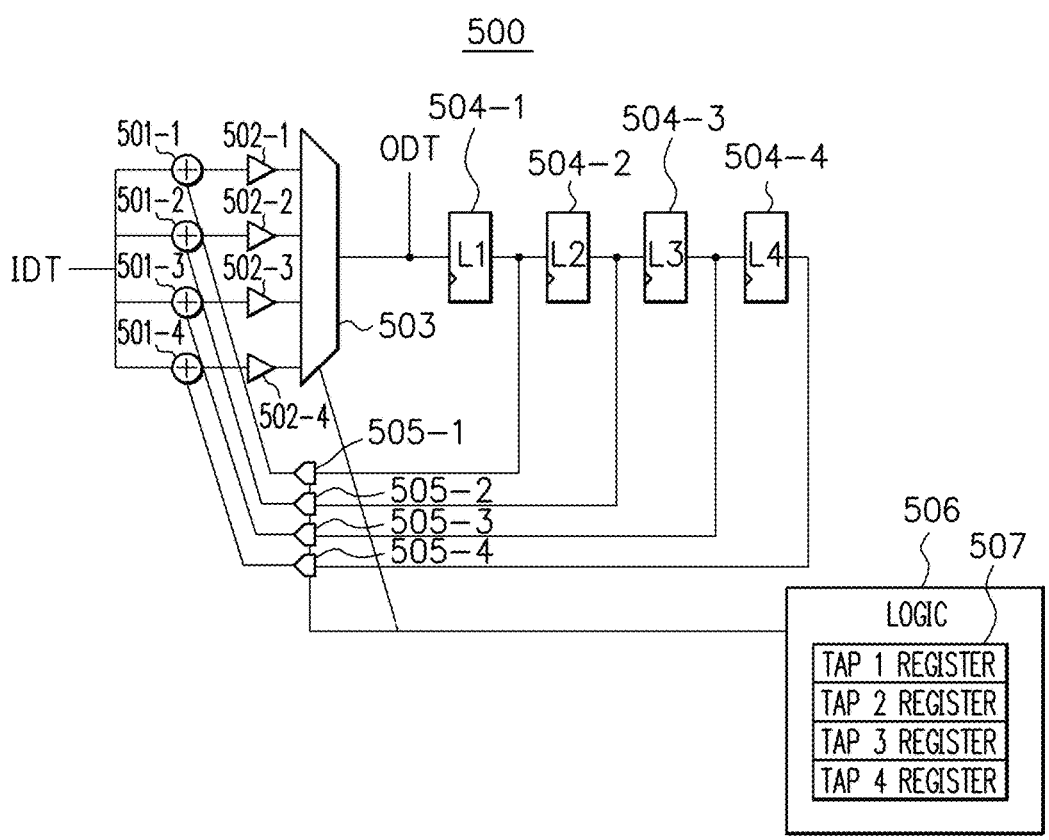

EQUALIZER CIRCUIT, RECEPTION CIRCUIT, AND SEMICONDUCTOR INTEGRATED CIRCUIT

CROSS-REFERENCE TO RELATED APPLICATION

This application is a continuation application of International Application PCT/JP2016/069441 filed on Jun. 30, 2016, and designated the U.S., the entire contents of which are incorporated herein by reference.

FIELD

The present invention relates to an equalizer circuit, a reception circuit, and a semiconductor integrated circuit.

BACKGROUND

One of equalizer circuits which compensate for a signal loss due to intersymbol interference (ISI) occurring due to influence of a bit sequence of a received data signal is a decision feedback equalizer (DFE) circuit (refer to, for example, Patent Literatures 1, 2). The compensation in the decision feedback equalizer circuit is performed based on the decision result of the past bit sequence, and a floating-tap decision feedback equalizer circuit can compensate for the influence due to an arbitrary bit in the bit sequence.

As illustrated as an example in FIG. 7, the floating-tap decision feedback equalizer circuit includes an addition circuit 701, a comparison circuit 702, a plurality of D latch circuits 703, a selection circuit (multiplexer circuit) 704, and a digital analog (DA) conversion circuit 705. The addition circuit 701 adds a compensation signal SG1 outputted from the DA conversion circuit 705 according to a bit selected from the past bit sequence to an input data signal IDT. The comparison circuit 702 performs binary determination on the output signal of the addition circuit 701, and outputs a determination result as an output data signal ODT.

The plurality of D latch circuits 703 are driven by a not-illustrated clock signal, and are connected in cascade as illustrated in FIG. 7 to hold the output data signal ODT. FIG. 7 illustrates an example including eight D latch circuits 703-1 to 703-8 (the number of taps is 8) which can hold past 8 bits. The output data signal ODT outputted from the comparison circuit 702 is inputted into the D latch circuit 703-1, and the output signal of the D latch circuit 703-$i$ ($i$=integer of 1 to 7) is inputted into the D latch circuit 703-($i$+1).

The multiplexer circuit 704 receives output signals of the plurality of D latch circuits 703, and selects and outputs the output signal of the D latch circuits 703 corresponding to the selected bit. The DA conversion circuit 705 digital-to-analog converts the output signal of the multiplexer circuit 704 according to the coefficient depending on the compensation intensity to generate and output the compensation signal SG1.

The floating-tap decision feedback equalizer circuit 700 illustrated in FIG. 7 selects by the multiplexer circuit 704 the past bit sequence held in the D latch circuit 703 to thereby select the position where the compensation is performed, decides the compensation intensity by the DA conversion circuit 705, and performs feedback to the addition circuit 701. For example, in the case of compensating for the influence by the data signal 5 UIs (unit intervals) ago, the output signal of the D latch circuit (L5) 703-5 is selected by the multiplexer circuit 704 and outputted to the DA conversion circuit 705. In this manner, the floating-tap decision feedback equalizer circuit 700 reflects the influence of the past data signal to the input data signal IDT to compensate for the signal loss due to the intersymbol interference.

In the conventional floating-tap decision feedback equalizer circuit 700 illustrated in FIG. 7, the input signal into the DA conversion circuit 705 delays by a delay amount ($T_{cd}$+ $T_{mux}$) obtained by totaling a delay $T_{cd}$ by the D latch circuit 703 and a delay $T_{mux}$ by the multiplexer circuit 704 as illustrated in FIG. 8. Therefore, if the operation speed of the circuit increases, the timing of feedback of the compensation signal SG1 to the addition circuit 701 becomes severe.

Further, the conventional floating-tap decision feedback equalizer circuit 700 illustrated in FIG. 7 can spread the compensation range by increasing the number of D latch circuits 703, but when the number of D latch circuits 703 is increased, the load on the multiplexer circuit 704 increases to make the delay $T_{mux}$ larger. As a result, the timing of feedback of the compensation signal SG1 to the addition circuit 701 becomes severe.

Patent Literature 1: Japanese Laid-open Patent Publication No. 2015-192200

Patent Literature 2: Japanese Laid-open Patent Publication No. 2000-49664

SUMMARY

One aspect of the equalizer circuit includes: an addition circuit configured to add an input signal and a compensation signal; a comparison circuit configured to compare an output signal of the addition circuit; a plurality of first latch circuits configured to hold an output signal of the comparison circuit, the plurality of first latch circuits being connected in cascade; a selection circuit configured to receive output signals of the comparison circuit and the plurality of first latch circuits, and to select and output one of the output signals; a second latch circuit configured to hold an output signal of the selection circuit; and a digital analog conversion circuit configured to generate the compensation signal, based on an output signal of the second latch circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a chart for explaining a delay in the equalizer circuit in the first embodiment;

FIG. 5 is a diagram illustrating a configuration example of an equalizer circuit in a second embodiment;

DESCRIPTION OF EMBODIMENTS

Hereinafter, embodiments of the present invention will be described based on the drawings.

First Embodiment

A first embodiment of the present invention will be described.

Figure 1:
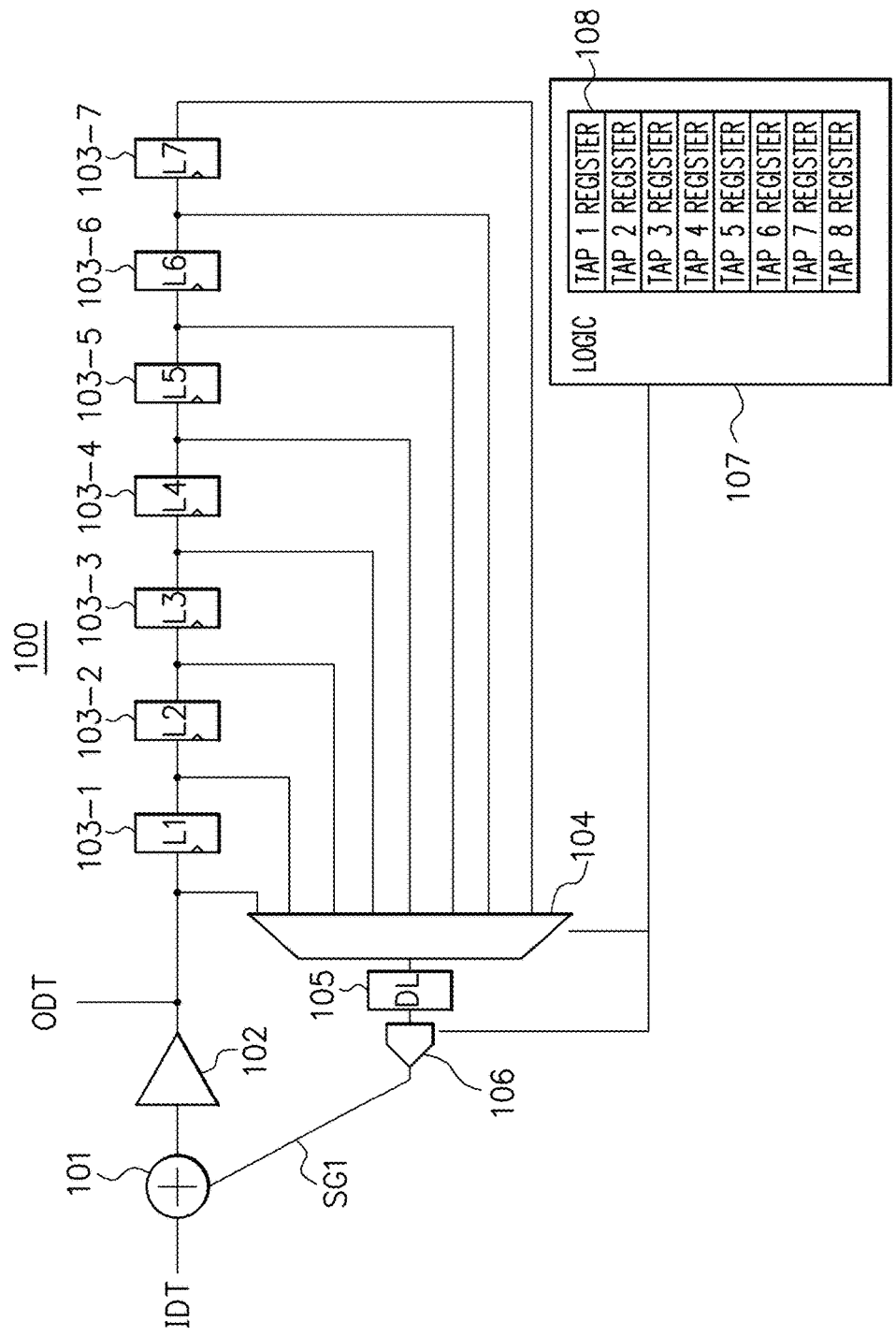
FIG. 1 is a diagram illustrating a configuration example of an equalizer circuit in a first embodiment.

FIG. 1 is a diagram illustrating a configuration example of an equalizer circuit 100 in the first embodiment. The equalizer circuit 100 is a floating-tap decision feedback equalizer circuit which compensates for the influence by an arbitrary bit in a past bit sequence. The floating-tap decision feedback equalizer circuit 100 includes an addition circuit 101, a comparison circuit 102, a plurality of D latch circuits 103, a selection circuit (multiplexer circuit) 104, a D latch circuit 105, a digital analog (DA) conversion circuit 106, and a logic circuit 107.

The addition circuit 101 adds a compensation signal SG1 outputted from the DA conversion circuit 106 according to a bit selected from the past bit sequence to an input data signal IDT, and outputs a resultant signal. The comparison circuit 102 compares the output signal of the addition circuit 101. The comparison circuit 102 performs binary determination on the output signal of the addition circuit 101, and outputs a determination result as an output data signal ODT.

The plurality of D latch circuits 103 are driven by a not-illustrated clock signal, and are connected in cascade as illustrated in FIG. 1 to hold the output data signal ODT. FIG. 1 illustrates an example including seven D latch circuits 103-1 to 103-7, which can hold past 7 bits. The output data signal ODT outputted from the comparison circuit 102 is inputted into the D latch circuit 103-1, and the output signal of the D latch circuit 103-$i$ (i=integer of 1 to 6) is inputted into the D latch circuit 103-($i$+1). Note that the number of the D latch circuits 103 is not limited to the above, but is a number smaller by 1 than the number of taps in the equalizer circuit. In other words, the total number of the D latch circuits obtained by totaling the D latch circuits 103 and the D latch circuit 105 is equal to the number of taps in the equalizer circuit.

Into the multiplexer circuit 104, the output signal of the comparison circuit 102 (output data signal ODT) and the output signals of the D latch circuits 103-1 to 103-7 are inputted. The multiplexer circuit 104 selects and outputs one of the output signal of the comparison circuit 102 and the output signals of the D latch circuits 103-1 to 103-7 according to the control by the logic circuit 107.

The D latch circuit 105 is driven by the not-illustrated clock signal, and holds the output signal of the multiplexer circuit 104. The DA conversion circuit 106 digital-to-analog converts the output signal of the D latch circuit 105 according to a coefficient supplied from the logic circuit 107 depending on a compensation intensity to generate and output the compensation signal SG1.

The logic circuit 107 performs compensation position selection processing to control the selection operation by the multiplexer circuit 104 and the coefficient depending on the compensation intensity to be supplied to the DA conversion circuit 106. The logic circuit 107 includes a register 108 which holds information on the compensation intensity (adjustment value) to intersymbol interference (ISI) at the taps in the equalizer circuit. The information on the compensation intensity (adjustment value) is acquired by measurement before actual communication such as at starting, and stored in the register 108.

The logic circuit 107 detects a tap position where the compensation intensity is highest, on the basis of the information held in the register 108, and controls the selection operation by the multiplexer circuit 104 and the coefficient depending on the compensation intensity to be supplied to the DA conversion circuit 106. In this embodiment, the D latch circuit 105 is arranged at a stage subsequent to the multiplexer circuit 104, and therefore the logic circuit 107 performs control so that a tap at a position preceding by one to the tap position where the compensation intensity is highest is selected in the multiplexer circuit 104.

Figure 2:
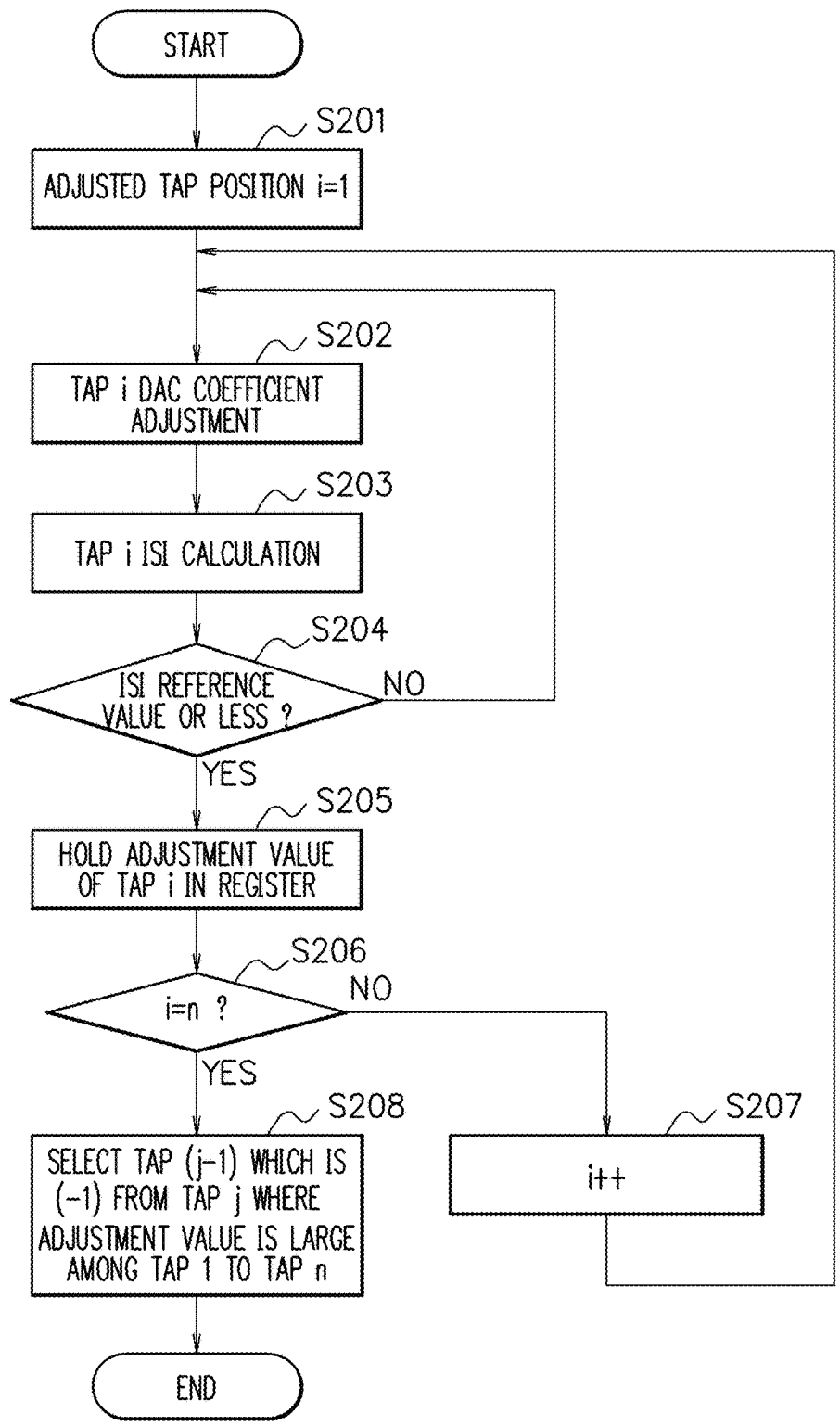
FIG. 2 is a flowchart illustrating an example of compensation position selection processing in the first embodiment.

FIG. 2 is a flowchart illustrating an example of the compensation position selection processing in the first embodiment. The compensation position selection processing is performed before actual communication such as at starting. First, at step S201, the logic circuit 107 selects a first tap (tap 1) as the tap position.

At step S202, the logic circuit 107 adjusts the coefficient to be supplied to the DA conversion circuit 106. Next, at step S203, a test data pattern or the like is inputted as the input data signal IDT to the equalizer circuit 100, and the logic circuit 107 calculates the magnitude of the intersymbol interference (ISI) at the selected tap position. Subsequently, at step S204, the logic circuit 107 determines whether or not the magnitude of the intersymbol interference (ISI) obtained at step S203 is a reference value or less.

When the logic circuit 107 determines that the magnitude of the intersymbol interference (ISI) obtained at step S203 is not the reference value or less, the logic circuit 107 returns to step S202, and the coefficient to be supplied to the DA conversion circuit 106 is changed and the above-described processing is performed. On the other hand, when the logic circuit 107 determines that the magnitude of the intersymbol interference (ISI) obtained at step S203 is the reference value or less, at step S205, the logic circuit 107 holds the coefficient (adjustment value) supplied to the DA conversion circuit 106 in the register 108.

Next, at step S206, the logic circuit 107 determines whether or not the selected tap position is an n-th tap (tap n) being the last, namely, there is an unselected tap position. As a result, when the selected tap position is not the n-th tap, namely, there is an unselected tap position, the logic circuit 107 selects a next tap as the tap position at step S207, and performs processing at step S202 and thereafter. On the other hand, when the selected tap position is the n-th tap, namely, there is no unselected tap position, the logic circuit 107 proceeds to step S208.

At step S208, the logic circuit 107 selects, referring to the information held in the register 108, a tap at a position preceding by one to the tap where the coefficient (adjustment value) supplied to the DA conversion circuit 106 is largest and decides it as a tap to be used for compensation, and ends the processing.

The floating-tap decision feedback equalizer circuit 100 in the first embodiment selects the bit of the tap decided as described above by the multiplexer circuit 104, generates the compensation signal SG1 by the DA conversion circuit 106, and performs feedback to the addition circuit 101. In this manner, the floating-tap decision feedback equalizer circuit 100 reflects the influence of the past data signal to the input data signal IDT to compensate for the signal loss due to the intersymbol interference.

Figure 3:
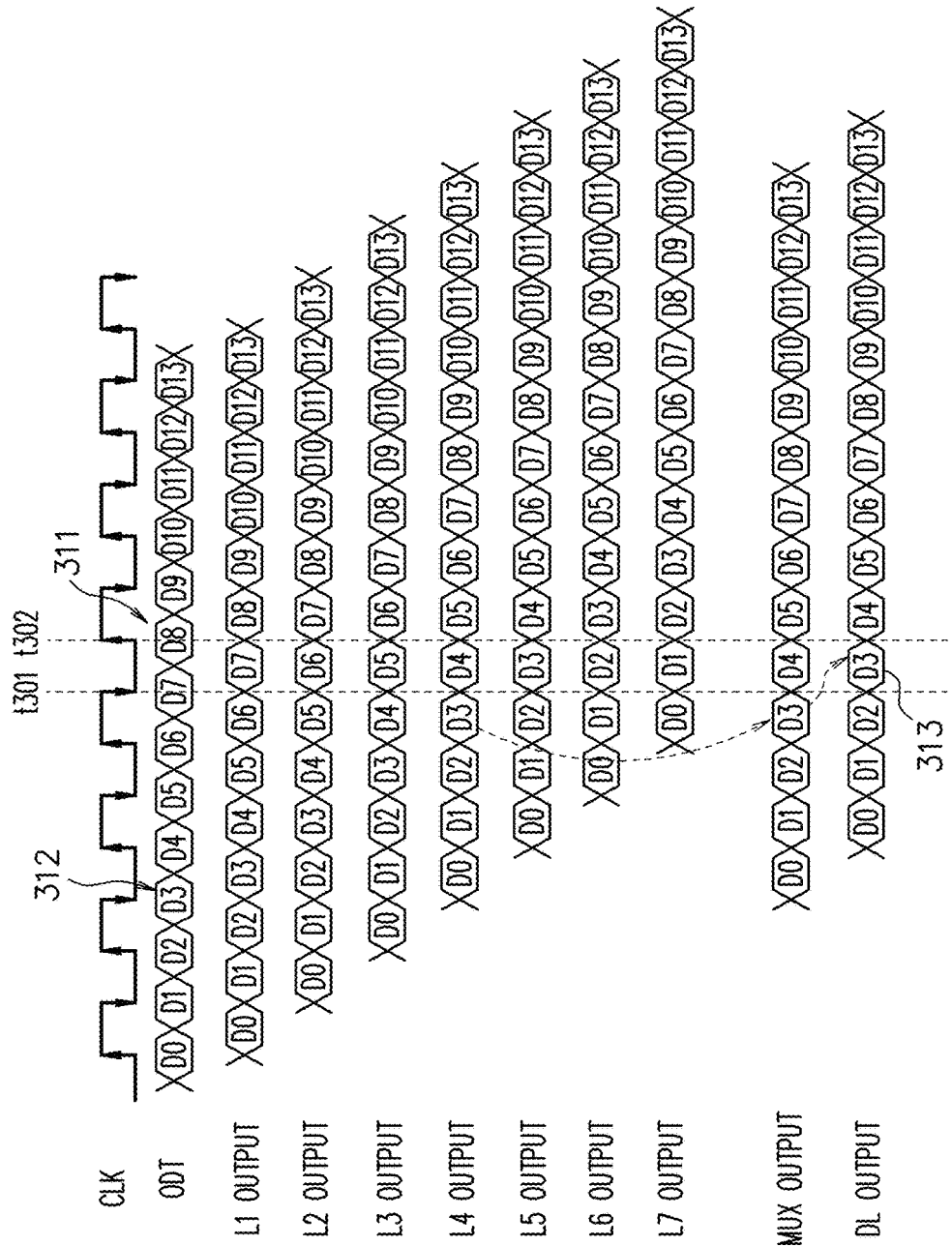
FIG. 3 is a timing chart illustrating an operation example of the equalizer circuit in the first embodiment.

For example, in the case of compensating for the influence by the data signal 5 UIs (unit intervals) ago, as illustrated in FIG. 3, the output signal of the D latch circuit (L4) 103-4 is selected by the multiplexer circuit 104, and outputted to the DA conversion circuit 106 via the D latch circuit 105. For example, when compensation for data signal (D8) 311 illustrated in FIG. 3 is performed, the compensation is performed using data (D3) 312 which is data 5 UIs ago. In this case, the multiplexer circuit 104 selects the output signal of the D latch circuit (L4) 103-4, whereby the compensation signal SG1 according to data (D3) 313 outputted from the D latch circuit 105 at time t301 is generated, and the compensation for the data signal (D8) 311 is performed.

Since the output signal of the multiplexer circuit 104 is supplied to the DA conversion circuit 106 via the D latch circuit 105 here in this embodiment, as illustrated in FIG. 4, a delay $T_{mux}$ by the multiplexer circuit 104 is canceled and the input signal into the DA conversion circuit 106 delays by a delay $T_{cd}$ by the D latch circuit 105. Therefore, according to this embodiment, the timing when the compensation signal SG1 is fed back to the addition circuit 101 can be relaxed, and the operation margin of the circuit can be improved.

Second Embodiment

Next, a second embodiment of the present invention will be described.

FIG. 5 is a diagram illustrating a configuration example of an equalizer circuit 500 in the second embodiment. The equalizer circuit 500 is a floating-tap decision feedback equalizer circuit which compensates for the influence by an arbitrary bit in a past bit sequence. The floating-tap decision feedback equalizer circuit 500 includes a plurality of addition circuits 501, a plurality of comparison circuits 502, a selection circuit (multiplexer circuit) 503, a plurality of D latch circuits 504, a plurality of digital analog (DA) conversion circuits 505, and a logic circuit 506.

The addition circuit 501-j (j is an integer of 1 to 4) adds a compensation signal outputted from the DA conversion circuit 505-j to an input data signal IDT and outputs a resultant signal. The comparison circuit 502-j compares the output signal of the addition circuit 501-j. The comparison circuit 502-j performs binary determination on the output signal of the addition circuit 501-j, and outputs a determination result.

The multiplexer circuit 503 receives the output signals of the comparison circuits 502-1 to 502-4 and selects one of the output signals according to the control by the logic circuit 506 and outputs the selected output signal as an output data signal ODT. The D latch circuit 504 is driven by a not-illustrated clock signal, and is connected in cascade as illustrated in FIG. 5 to hold the output data signal ODT. FIG. 5 illustrates an example including four D latch circuits 504-1 to 504-4, which can hold past 4 bits. The output data signal ODT outputted from the multiplexer circuit 503 is inputted into the D latch circuit 504-1, and the output signal of the D latch circuit 504-i (i=integer of 1 to 3) is inputted into the D latch circuit 504-(i+1).

The DA conversion circuit 505-j digital-to-analog converts the output signal of the D latch circuit 504-j according to the coefficient supplied from the logic circuit 506 depending on the compensation intensity to generate and output the compensation signal. The logic circuit 506 performs the above-described compensation position selection processing to control the selection operation by the multiplexer circuit 503 and the coefficient depending on the compensation intensity to be supplied to the DA conversion circuit 505. The logic circuit 506 includes a register 507 which holds information on the compensation intensity (adjustment value) to intersymbol interference (ISI) at the taps in the equalizer circuit. The information on the compensation intensity (adjustment value) is acquired by measurement before actual communication such as at starting, and stored in the register 507.

The logic circuit 506 detects a tap position where the compensation intensity is highest, on the basis of the information held in the register 507, and controls the selection operation by the multiplexer circuit 503 and the coefficient depending on the compensation intensity to be supplied to the DA conversion circuit 505. In this embodiment, the logic circuit 506 performs control so that the output signal of the comparison circuit 502 corresponding to the tap position where the compensation intensity is highest is selected in the multiplexer circuit 503.

Since the input signal into the DA conversion circuit 505 delays by a delay $T_{cd}$ by the D latch circuit 504 also in the second embodiment, the timing when the compensation signal SG1 is fed back to the addition circuit 501 can be relaxed, and the operation margin of the circuit can be improved.

Figure 6:
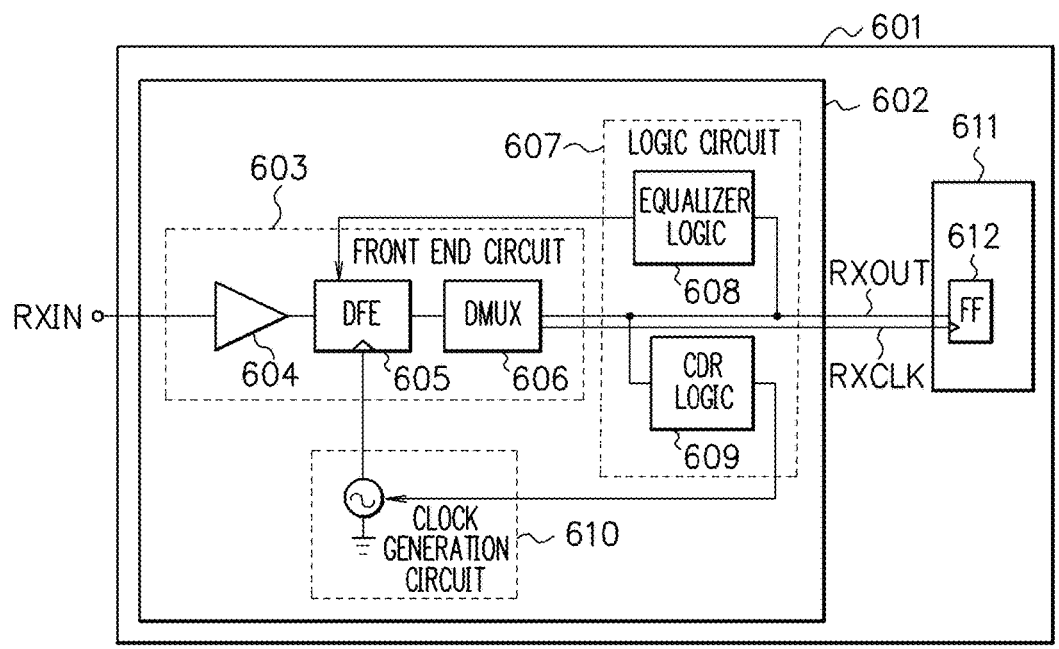
FIG. 6 is a diagram illustrating a configuration example of a semiconductor integrated circuit in this embodiment.
Figure 7:
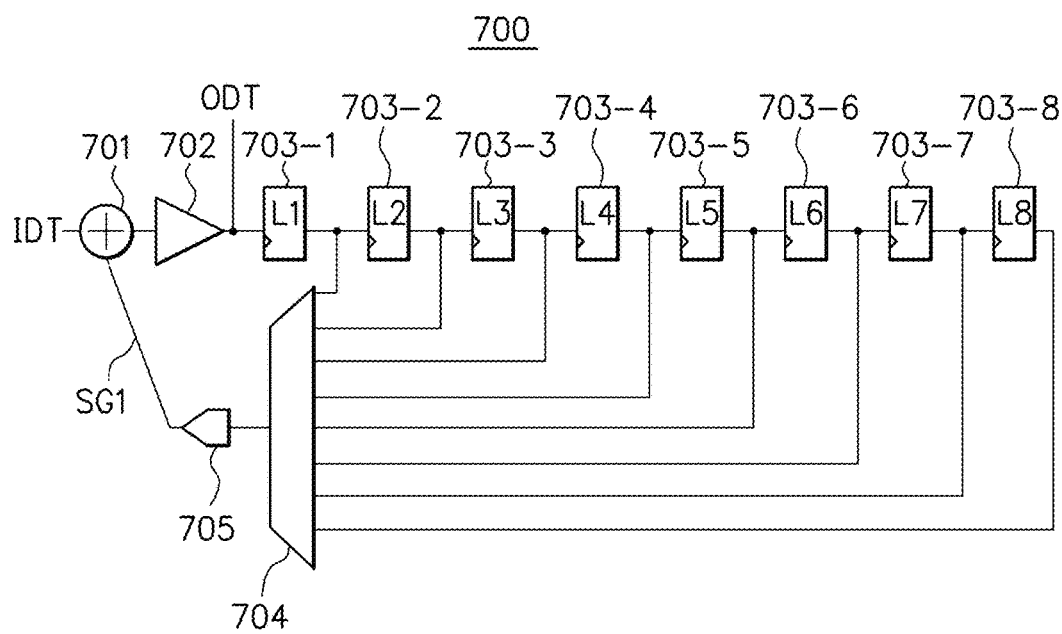
FIG. 7 is a diagram illustrating a configuration example of a conventional equalizer circuit.
Figure 8:
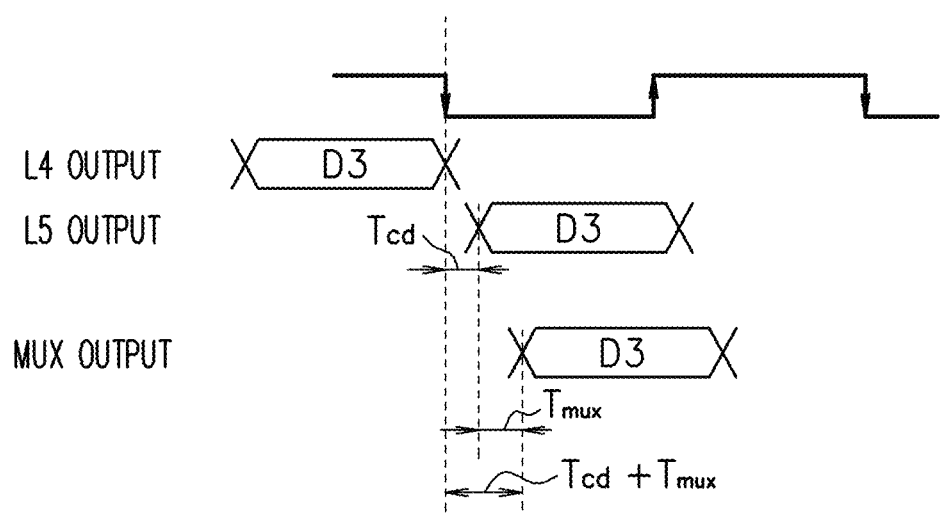
FIG. 8 is a chart for explaining a delay in the conventional equalizer circuit.

FIG. 6 is a diagram illustrating a configuration example of a semiconductor integrated circuit including the equalizer circuit in each of the above-described embodiments. A semiconductor integrated circuit 601 in this embodiment includes a reception circuit 602 having a function of a deserializer circuit which converts an input serial signal into a parallel signal, and an internal circuit 611 such as a logic circuit which receives the parallel signal (data) from the reception circuit 602 to perform a processing operation.

The reception circuit 602 includes a front end circuit 603, a logic circuit 607, and a clock generation circuit 610. The front end circuit 603 includes a buffer 604, a decision feedback equalizer circuit 605, and a demultiplexer circuit 606. The buffer 604 receives an input serial signal RXIN transmitted via a transmission path and so on. The decision feedback equalizer circuit 605 is, for example, the decision feedback equalizer circuit illustrated in FIG. 1 or FIG. 5 and decides a code (data) of the input serial signal. The demultiplexer circuit 606 performs serial-to-parallel conversion on the output signal of the decision feedback equalizer circuit 605 and outputs a resultant output as a parallel signal RXOUT and outputs a reception data clock RXCLK.

The logic circuit 607 includes an equalizer logic circuit 608 and a clock data recovery logic circuit 609. The equalizer logic circuit 608 performs a control relating to the decision feedback equalizer circuit 605 to control, for example, the operation of the selection circuit and the coefficient to be supplied to the DA conversion circuit. The clock data recovery logic circuit 609 appropriately controls the phase of the clock signal outputted from the clock generation circuit 610, on the basis of the output signal (parallel signal RXOUT) of the demultiplexer circuit 606.

The decision feedback equalizer 605 samples the input serial signal at appropriate timing using the clock signal outputted from the clock generation circuit 610. The parallel signal RXOUT outputted from the reception circuit 602 is taken into the internal circuit 611 by a flip flop 612 which operates by the reception data clock RXCLK, and subjected to processing and the like.

Note that the above-described embodiments merely illustrate examples of materialization in implementing the present invention, and the technical scope of the present invention is not to be construed in a restrictive manner by these embodiments. That is, the present invention may be implemented in various forms without departing from the technical spirit or main features thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An equalizer circuit comprising:
   an addition circuit configured to add an input signal and a compensation signal;
   a comparison circuit configured to compare an output signal of the addition circuit with a threshold value thereof;
   a plurality of first latch circuits configured to hold an output signal of the comparison circuit, the plurality of first latch circuits being connected in cascade;
   a selection circuit configured to receive the output signal of the comparison circuit and output signals of the plurality of first latch circuits, and to select and output one of the output signal of the comparison circuit and the output signals of the plurality of first latch circuits;
   a second latch circuit configured to hold an output signal of the selection circuit; and
   a digital analog conversion circuit configured to generate the compensation signal, based on an output signal of the second latch circuit.

2. The equalizer circuit according to claim 1, wherein the number of the plurality of first latch circuits is smaller by one than the number of taps in the equalizer circuit.

3. The equalizer circuit according to claim 1, further comprising:
   a logic circuit configured to control selection processing by the selection circuit and generation processing of the compensation signal by the digital analog conversion circuit.

4. The equalizer circuit according to claim 1, wherein a total number of latch circuits obtained by totaling the plurality of first latch circuits and the second latch circuit is equal to the number of taps in the equalizer circuit.

5. The equalizer circuit according to claim 1, wherein the comparison circuit is configured to perform binary determination on the output signal of the addition circuit, and to output a determination result to a front of the plurality of first latch circuits.

6. A reception circuit comprising:
   an equalizer circuit according to claim 1, the equalizer circuit being configured to sample a serial signal as the input signal using a clock signal, and to determine and output data of the serial signal;
   a demultiplexer circuit configured to perform serial-to-parallel conversion on an output signal of the equalizer circuit and to output a parallel signal; and
   a clock data recovery circuit configured to control a phase of the clock signal, based on an output signal of the demultiplexer circuit.

7. The reception circuit according to claim 6, wherein the number of the plurality of first latch circuits is smaller by one than the number of taps in the equalizer circuit.

8. The reception circuit according to claim 6, wherein a total number of latch circuits obtained by totaling the plurality of first latch circuits and the second latch circuit is equal to the number of taps in the equalizer circuit.

9. A semiconductor integrated circuit comprising:
   an equalizer circuit according to claim 1, the equalizer circuit being configured to sample a serial signal as the input signal using a clock signal, and to determine and output data of the serial signal;
   a demultiplexer circuit configured to perform serial-to-parallel conversion on an output signal of the equalizer circuit and to output a parallel signal;
   a clock data recovery circuit configured to control a phase of the clock signal, based on an output signal of the demultiplexer circuit; and
   an internal circuit configured to receive the parallel signal from the demultiplexer circuit to perform a processing operation.

10. The semiconductor integrated circuit according to claim 9, wherein the number of the plurality of first latch circuits is smaller by one than the number of taps in the equalizer circuit.

11. The semiconductor integrated circuit according to claim 9, wherein a total number of latch circuits obtained by totaling the plurality of first latch circuits and the second latch circuit is equal to the number of taps in the equalizer circuit.

12. An equalizer circuit comprising:
    an addition circuit configured to add an input signal and a compensation signal, the compensation signal being based on a data signal which is n unit intervals prior to the input signal, n being a natural number;
    a comparison circuit configured to compare an output signal of the addition circuit with a threshold value thereof;
    a plurality of first latch circuits configured to hold an output signal of the comparison circuit;
    a selection circuit configured to select and output a data signal which is (n–1) unit intervals prior to the input signal, from among the output signal of the comparison circuit and output signals of the plurality of first latch circuits;
    a second latch circuit configured to hold an output signal of the selection circuit; and
    a digital analog conversion circuit configured to generate the compensation signal, based on an output signal of the second latch circuit.

13. The equalizer circuit according to claim 12, wherein a total number of latch circuits obtained by totaling the plurality of first latch circuits and the second latch circuit is equal to the number of taps in the equalizer circuit.

14. The equalizer circuit according to claim 12, wherein the plurality of first latch circuits are connected in cascade.

15. The equalizer circuit according to claim 12, wherein the comparison circuit is configured to perform binary determination on the output signal of the addition circuit, and to output a determination result to a front of the plurality of first latch circuits.

16. A reception circuit comprising:
    equalizer circuit according to claim 12, the equalizer circuit being configured to sample a serial signal as the input signal using a clock signal, and to determine and output data of the serial signal;
    a demultiplexer circuit configured to perform serial-to-parallel conversion on an output signal of the equalizer circuit and to output a parallel signal; and
    a clock data recovery circuit configured to control a phase of the clock signal, based on an output signal of the demultiplexer circuit.

17. The reception circuit according to claim 16, wherein a total number of latch circuits obtained by totaling the plurality of first latch circuits and the second latch circuit is equal to the number of taps in the equalizer circuit.

18. A semiconductor integrated circuit comprising:
an equalizer circuit according to claim 12, the equalizer circuit being configured to sample a serial signal as the input signal using a clock signal, and to determine and output data of the serial signal;
a demultiplexer circuit configured to performs serial-to-parallel conversion on an output signal of the equalizer circuit and to output a parallel signal;
a clock data recovery circuit configured to control a phase of the clock signal, based on an output signal of the demultiplexer circuit; and
an internal circuit configured to receive the parallel signal from the demultiplexer circuit to perform a processing operation.

19. The semiconductor integrated circuit according to claim 18, wherein a total number of latch circuits obtained by totaling the plurality of first latch circuits and the second latch circuit is equal to the number of taps in the equalizer circuit.

20. An equalizer circuit comprising:
a plurality of addition circuits each of which configured to add an input signal and a compensation signal;
a plurality of comparison circuits each configured to compare an output signal of a corresponding addition circuit with a threshold value thereof, the plurality of comparison circuits being provided in a same number as the plurality of addition circuits;
a selection circuit configured to select and output one of output signals of the plurality of comparison circuits;
a plurality of latch circuits configured to hold an output signal of the selection circuit, the plurality of latch circuits being connected in cascade; and
a plurality of digital analog conversion circuits configured to generate the compensation signal to be supplied to the corresponding addition circuit, based on an output signal of a corresponding latch circuit, the plurality of digital analog conversion circuits being provided in the same number as the plurality of addition circuits.

\* \* \* \* \*